United States Patent [19]

Bank et al.

[11] Patent Number: 5,010,159

[45] Date of Patent: Apr. 23, 1991

[54] PROCESS FOR THE SYNTHESIS OF SOLUBLE, CONDENSED HYDRIDOSILICON RESINS CONTAINING LOW LEVELS OF SILANOL

[75] Inventors: Howard M. Bank, Freeland; Martin E. Cifuentes; Theresa E. Martin, both of Midland, all of Mich.

[73] Assignee: Dow Corning Corporation, Midland, Mich.

[21] Appl. No.: 401,726

[22] Filed: Sep. 1, 1989

[51] Int. Cl.$^5$ .................................................. C08G 77/06
[52] U.S. Cl. ........................................... 528/23; 528/31
[58] Field of Search ...................................... 528/23, 31

[56] References Cited

U.S. PATENT DOCUMENTS

| | | | |
|---|---|---|---|
| 2,901,460 | 8/1959 | Boldebuck | 260/46.5 |
| 3,489,782 | 1/1970 | Pruvost et al. | 260/448.2 |
| 3,615,272 | 10/1971 | Collins et al. | 23/366 |

Primary Examiner—Melvyn I. Marquis
Attorney, Agent, or Firm—Roger E. Gobrogge

[57] ABSTRACT

This invention relates to an improved method of hydrolyzing hydridosilanes with 2 or more hydrolyzable groups which comprises forming an arylsulfonic acid hydrate containing reaction medium, adding the silane to the hydrolysis medium, facilitating hydrolysis of the silane to form the polyester, settling the hydrolysis medium and polymer into an acid layer and an organic layer containing the polymer, separating the organic layer from the acid layer, contacting the organic layer with a neutralizing agent, and removing the neutrailizing agent from the organic layer.

38 Claims, No Drawings

PROCESS FOR THE SYNTHESIS OF SOLUBLE, CONDENSED HYDRIDOSILICON RESINS CONTAINING LOW LEVELS OF SILANOL

This invention was made with U.S. Government Support under Contract No. F4962086-C-0110 awarded by the United States Air Force. The Government has certain rights in the invention.

BACKGROUND OF THE INVENTION

This invention relates to an improved method of hydrolyzing hydridosilanes with 2 or more hydrolyzable groups to form polymers, said method comprising forming an arylsulfonic acid hydrate containing hydrolysis medium, adding the silane to the hydrolysis medium, facilitating hydrolysis of the silane to form the polymer, settling the hydrolysis medium and polymer into an acid layer and an organic layer containing the polymer, separating the organic layer from the acid layer, contacting the organic layer with a neutralizing agent, and separating the organic layer from the neutralizing agent.

The polymers formed by the above process have excellent coating and sealing characteristics when cured to their ceramic or ceramic-like state. Most recently such polymers have found particular utility in coating electronic devices to form protective barriers. See for example Haluska et al., U.S. Pat. No. 4,756,977.

It is well known in the prior art that halosilanes readily hydrolyze in the presence of water to form silanols which condense to form polysiloxanes. Furthermore, it is well known that these two processes occur almost simultaneously when the halosilane contains three or more halogen atoms. The result of this rapid hydrolysis and condensation is an insoluble gel which is of little practical value. See eg. Boldebuck, U.S. Pat. No. 2,901,460.

Numerous solutions to the above problem have been suggested. Boldebuck described above, for instance, utilizes a hydrolysis medium comprising tetrahydrofuran and water in an attempt to alleviate the gelling. It is disclosed therein that the use of a chlorosilane with this medium results in the formation of a hydrolysate which spontaneously separates. The resultant hydrolysates are subsequently washed with water and heated to form a hard resinous polysiloxane.

U.S. Pat. No. 3,489,782 granted to Pruvost et al. discloses a process for hydrolyzing silanes which comprises dissolving the silane in a polar solvent, hydrolyzing the silane in a single liquid homogenous phase and separating the hydrolysate from the secondary reaction products. It is disclosed therein that the separation may be accomplished by neutralization with a base or by washing with water and subsequent neutralization. This reference, however, does not disclose the use of a hydrolysis medium comprising an arylsulfonic acid hydrate or the step of washing the organic phase with sulfuric acid and then neutralization with a base.

U.S. Pat. No. 3,615,272 granted to Frye et al. describes a process for forming hydrogensilsesquioxane resin comprising reacting a silane in a hydrocarbon solvent with sulfuric acid and an aromatic hydrocarbon, washing the reaction mixture with water and sulfuric acid until neutral and recovering the product by evaporating the solvent. Nowhere does this reference describe the use of a mild base to neutralize the organic phase. Furthermore, numerous difficulties developed when scale-up of the above process was attempted.

It has now been unexpectedly found that the process of the present invention provides an improved commercially viable process for the synthesis of hydrocarbon soluble siloxane resins.

SUMMARY OF THE INVENTION

The invention relates to a method of hydrolyzing a silane of the formula $H_aSiX_{4-a}$ where a is 1 or 2 and X is a hydrolyzable group, to produce polymers containing units of the formula $H_aSiO_{(4-a)/2}$, the method comprising:

forming a hydrolysis medium containing an arylsulfonic acid hydrate, adding a liquid containing the silane to the agitated hydrolysis medium, facilitating hydrolysis of the silane in the hydrolysis medium to form the polymer, settling the hydrolysis medium and polymer into immiscible layers comprising an acid layer and an organic layer where the organic layer contains the polymer, separating the organic layer from the acid layer, contacting the organic layer with a neutralizing agent sufficiently basic to neutralize the remaining acid species but insufficiently basic to catalyze rearrangement of the polymer or solvolysis of silicon hydrides, and separating the organic layer from the neutralizing agent. This process may be performed on both an individual batch basis as well as a continuous operation.

DETAILED DESCRIPTION OF THE INVENTION

The compound to be hydrolyzed in the above reaction can be any hydridosilane with 2 or more hydrolyzable substituents and can be represented by the following formula:

$$H_aSiX_{4-a}$$

wherein a can be 1 or 2 and X can be the same or different and can include any hydrolyzable group. Suitable hydrolyzable substituents can include, for example, halogens, such as F, Cl, Br or I and organic groups linked to the silicon atom by oxygen bonds such as

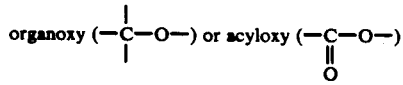

groups. Examples of hydrolyzable groups with the Si-O-C linkage include alkoxy such as methoxy, ethoxy, butoxy, or hexoxy; alkenyloxy such as allyloxy; cycloalkoxy such as cyclopentoxy or cyclohexoxy; aryloxy such as phenoxy or naphthoxy; cycloalkenyloxy such as cyclopentenyloxy; and acetoxy. The various organic radicals above can also be substituted, for example, by alkyls, aryls or halogens. It is generally preferred that the organic groups of the above radicals contain 1-6 carbon atoms, but groups with higher numbers of carbon atoms may also be used. Additional examples of hydrolyzable substituents can include sulfur functional groups such as sulfuric, organosulfuric or organosulfonic and nitrogen functional groups such as amino or hydrazino.

Preferably, the hydrolyzable groups in the above formula are halogens. Upon hydrolysis, these groups will yield a hydrogen halide which may facilitate hydrolysis and/or condensation and is easily removed from the product by washing. On the contrary, if an organoxy group is used, alcohols are formed which may result in the solvolysis of the Si-H bonds and evolution of hydrogen gas. Though these latter groups are functional, facilitating measures such as addition of an acid or a base to the hydrolysis medium may be necessary.

Most preferably, the silane utilized in the above invention is trichlorosilane.

The various hydridosilanes defined above can be hydrolyzed alone, cohydrolyzed or cohydrolyzed with one or more organosilanes of the formulas:

$$R_aSiX_{4-a} \text{ or } R'RSiX_2$$

wherein a is one or two, X is as defined above, R is alkyl such as methyl, ethyl, propyl, octyl, dodecyl etc., a cycloalkyl such as cyclopentyl or cyclohexyl, a cycloalkenyl such as cyclopentenyl or cyclohexenyl, an aryl such as phenyl or naphthyl, an unsaturated hydrocarbon such as vinyl or allyl or R can be any of the above groups substituted with substituents such as halogens, alkyls or aryls including, for example, methylcyclohexyl, phenylethyl or chloromethyl, and R' is R or H.

Thus, for instance a cohydrolysate can be formed by mixing varying proportions of an alkyltrihalosilane and a hydrogentrihalosilane or a hydrogentrihalosilane and a dialkyldihalosilane.

The above silanes are generally utilized in the form of a liquid. This liquid may consist essentially of the silane in its liquid state or it may comprise the silane dissolved in a hydrocarbon solvent to form a solution. If a solvent is to be used, it can include any suitable hydrocarbon which is a solvent for the silane reactant. Exemplary of such solvents are saturated aliphatics such as dodecane, n-pentane, hexane, n-heptane and isooctane; aromatics such as benzene, toluene and xylene; cycloaliphatics such as cyclohexane; halogenated aliphatics such as trichloroethylene and perchloroethylene; and halogenated aromatics such as bromobenzene and chlorobenzene. Additionally, combinations of the above solvents may be used together as cosolvents for the silane. The preferred hydrocarbons are aromatic compounds because of their high volatility and, of these, toluene is the most preferred because of its safety profile.

The hydrolysis medium of the above invention comprises an arylsulfonic acid hydrate solution. The aryl moiety of this compound may comprise, for example, benzene, toluene or xylene. This solution can be formed by either dissolving the arylsulfonic acid hydrate in a solvent, such as an alcohol, or it can be generated by reacting an aromatic hydrocarbon with concentrated sulfuric acid. The latter sulfonation reaction, which is the preferred route to the above hydrolysis medium, can be represented as follows:

H₂SO₄ + Aromatic Hydrocarbon → Arylsulfonic acid hydrate

The arylsulfonic acid hydrate thereby formed donates the water necessary for silane hydrolysis as described below.

The kinetics of the above sulfonation reaction have been studied and found to be mass transfer controlled as a result of the limited solubility of the aromatic hydrocarbon in sulfuric acid. With improved mixing and heating, therefore, both the rate and extent of reaction may be increased. For example, the reaction may be conducted in a baffled device such as a morton flask or in a baffled container with a multibladed stirring mechanism. When the reaction is conducted in such a device stirred at a high rate of speed such as about 200-700 rpm and the temperature is maintained in the range of 20°-120° C., the efficiency of sulfonation may be greatly improved. The presence of water in the hydrolysis medium (both the amount present in the sulfuric acid as well as that generated by the reaction), on the other hand, has been shown to limit the sulfonation reaction. For instance, if molar quantities of sulfuric acid and toluene are heated to 45°-70° C. for 1 hour and then stirred for 30-60 minutes at 45° C., only about 50-65 weight percent toluenesulfonic acid monohydrate is generated in the acid phase. As water is consumed by the hydrolysis reaction, however, the sulfonation reaction continues until an average of 81.6 weight percent of the toluene sulfonic acid is generated in the acid phase. Since the above factors (i.e. degree of mixing temperature and quantity of water) make it difficult for 100% sulfonation to occur, it is preferred to employ enough sulfuric acid and aromatic hydrocarbon to generate 200 percent of the water necessary for hydrolysis if 100 percent sulfonation were to occur.

The concentrated sulfuric acid utilized in generating the hydrolysis medium may contain up to 10 percent water. eg. industrial grade, but, as discussed supra, the excess water may affect the rate and extent of the sulfonation reaction. Because of this effect, the use of fuming sulfuric acid to consume excess water in the concentrated sulfuric acid prior to sulfonation is a preferred embodiment of the invention.

The aromatic hydrocarbons used in the sulfonation reaction can include compounds such as benzene, toluene, xylene and the like. Benzene and toluene are preferred because of their low boiling points which allow them to be easily evaporated to recover the product. Toluene is the most preferred hydrocarbon as it lacks the known toxicities and hazards associated with handling benzene.

When the silane is added to the hydrolysis medium, the following reaction occurs:

Arylsulfonic acid. hydrate + silane→Polymer + Arylsulfonic acid + HX wherein X is the hydrolyzable group defined supra. Since the silane hydrolysis most likely occurs at the interface of the above organic and acid phases, the hydrolysis medium is agitated during silane addition to increase the surface area of reaction. It is preferred that the silane addition proceed via a slow flow below the liquid surface to reduce the formation of resinous residues on the walls of the reaction vessel which occur as a result of the evolution of gaseous products. Upon addition of the silane, various facilitating measures such as continued vigorous mixing and temperature control are maintained to insure efficient hydrolysis. For example, the various baffled mixing devices described above may be utilized at a rate of about 200-700 rpm while maintaining the hydrolysis temperature in the range of 0°-80° C.

Formation of the arylsulfonic acid hydrate solution may either precede the introduction of the silane or it may occur concomitantly with the hydrolysis. However, control of the reaction temperature is more complex during concomitant addition due to the exothermic nature of the sulfonation reaction. Accordingly, it is preferred to generate the arylsulfonic acid hydrate prior to hydrolysis of the silane, thereby allowing one to more effectively control the rate and temperature of hydrolysis by external heating or cooling.

After the hydrolysis reaction is complete and the polymer formed, the mixture is phase separated by settling. This process may, for example, be accomplished by merely ceasing agitation of the hydrolysis mixture and allowing it to spontaneously separate into immiscible layers in the reaction vessel. The layers thus formed comprise an organic layer, which contains the polymer and the organic solvent, and an acid layer.

The organic layer is then separated from the acid layer. The separation may be accomplished by any convenient means such as draining off one or the other of the layers. Since the lower layer is generally the acid, it may be most beneficial, for example, to draw off this layer and retain the polymer in the reaction vessel for subsequent neutralization.

Neutralization may be effected by contacting the organic layer with the neutralizing agent or the organic layer may first be washed and then contacted with the neutralizer. The latter mechanism is generally preferred since many of the acidic reaction byproducts are removed by the wash and the quantity of neutralizing agent required thereby decreased.

If the organic layer is to be washed, the preferred wash solution is an aqueous sulfuric acid solution since it inhibits emulsion formation and product loss which may occur as a result of the surfactant nature of the polymer and the arylsulfonic acid byproduct. Wash solutions containing greater than 5% sulfuric acid are generally operable.

The organic layer, either washed or unwashed, is contacted with a neutralizing agent preferably in the presence of a small quantity of water which promotes hydrolysis of any remaining silane. The neutralizing agent must be sufficiently basic to neutralize any remaining acid species such as sulfuric acid, arylsufonic acid, SiOSO2H, SiOSO2R, hydrogen halides, organic acids etc., and yet insufficiently basic to catalyze rearrangement of the polymer or solvolysis of the silicon hydrides.

Suitable bases which do not cause the above detrimental effects may be readily determined by a simple test. In this test, a solution of the polymer similar to that generated by the above hydrolysis process is mixed with the base and subjected to conditions of time and temperature similar to those that may be encountered during neutralization. Those bases which result in gel formation or solvolysis of Si-H bonds, as evidenced by hydrogen gas evolution, should not be used.

Examples of suitable bases includes calcium carbonate, sodium carbonate, sodium bicarbonate, ammonium carbonate, ammonia, calcium oxide or calcium hydroxide. The base may be added to the organic phase in any form desired including the use of a solid, solution, aqueous dispersion or liquid. It has, however, been found that the best results may be obtained when the organic phase contacts the neutralizing agent for only a short time. This may be accomplished, for instance, by stirring in powdered neutralizing agent followed by filtration or by passing the organic phase over or through a bed of particulate neutralizing agent of a size which does not impede flow.

The novel neutralization step in the process affords several distinct advantages:
(1) it reduces the formation of gels and emulsions previously associated with water washing;
(2) it reduces the precipitates which may be seen when various hydrocarbon solvents or co-solvents are utilized;
(3) it allows high product yields by avoiding product and solvent loss, especially when the percent solids are increased;
(4) it provides products low in sulfur and acid content;
(5) it allows for rapid processing: and
(6) it allows for processing at higher solids levels.

Removing the neutralizing agent from the organic phase yields a solution of the desired polymeric product. It is preferred, however that the neutralized organic phase be dried and/or filtered to insure that any water soluble salts formed during neutralization or any other insolubles are removed. This step is desirable since the inclusion of such salts or insolubles in the product may adversely affect the polymers properties. Any suitable drying agent such as magnesium sulfate, sodium sulfate or a 3 or 4 angstrom molecular sieve may be utilized.

The solid form of the polymer may be recovered by merely removing the solvent. The method of solvent removal is not critical and numerous approaches are well known in the art. For instance, a process comprising (1) distilling off the solvent at atmospheric pressure to form a concentrate containing 40-80% resin and (2) removing the remaining solvent under vacuum and mild heat (0.1-5 hours at 60°-120° C.) may be utilized.

Alternatively, if it is desired to have the polymer in solution, a simple solvent exchange may be performed by merely adding a secondary solvent and distilling off the first. This option may be especially advantageous where regulatory guidelines restrict the use of certain solvents.

The polymers that can be obtained using the hydrolysis reaction of this invention are, naturally, variable depending on the silane utilized. The following nonlimiting list of possible hydrolysates and co-hydrolysates are, however, specifically contemplated:

[HSiO$_{3/2}$]$_n$

[H$_2$SiO]$_m$

[HSiO$_{3/2}$]$_x$[RSiO$_{3/2}$]$_y$

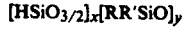[HSiO$_{3/2}$]$_x$[RR'SiO]$_y$

[HSiO$_{3/2}$]$_x$[RR'SiO]$_y$[SiO$_2$]$_z$

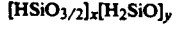[HSiO$_{3/2}$]$_x$[H$_2$SiO]$_y$

Wherein R and R' are as defined supra, n is greater than or equal to 2, m is greater than or equal to 3 and the mole fractions, x,y and z, must total 1 in each of the above copolymers. Of these compounds, the formation of [HSiO$_{3/2}$]$_n$ is of particular interest because or its superior resin characteristics.

The above resins are highly condensed products with only about 100–2000 ppm of hydroxyl groups attached to the silicon atom (silanol). They are soluble in suitable hydrocarbon solvents. including those discussed supra, and they are stable in these solutions for periods of greater than six months.

Upon heating to elevated temperatures in air, the above resins are converted to smooth protective layers of amorphous silica without pinholes or cracks. See eg. Haluska et al., U.S. Pat. No. 4,756,977. These protective layers have found particular utility in coating electronic circuits wherein they serve as a planarizing coating to preserve the integrity of the circuits against environmental stress. They are applied directly on the primary passivated circuit surface to seal the bond pads, pinholes and cracks of the primary passivation and to provide an adherent surface for subsequently applied coatings.

The resins of the invention are generally applied to the surface of the electronic device in the form of a dilute solution by methods such as spin coating, dip coating, spray coating or flow coating. The solvent is then allowed to evaporate by drying to form a homogenous resin which is then ceramified by heating. The thin ceramic layers thereby formed may be further coated with additional passivating layers.

The following nonlimiting examples are provided so that one skilled in the art may more fully understand the invention.

EXAMPLE 1

The following is a typical example of the hydrolysis process.

SULFONATION 553.4 g of concentrated sulfuric acid (95–98%) and 277.8 g of fuming sulfuric acid (20% $SO_3$) (total acid = 8.48 moles/831.2 g) were added to a 5 L vessel. An exotherm to 40' C. was observed. A nitrogen atmosphere was maintained in the vessel as toluene (8.43 moles, 775.9 g) was pumped at a rate of 19.9 mL/min into the acid. During the addition, the mixture was agitated with a paddle stirrer rotating at approximately 500 rpm. The temperature of the mixture rose to 62.5° C. after 24 minutes but subsequently began falling. The temperature was maintained at 48° C. through the remainder of the toluene addition and for a 34 minute post stir. When the agitation was stopped, 2 phases were present; an organic phase containing unreacted toluene and an acid phase containing unreacted sulfuric acid and 64.8 weight percent toluene sulfonic acid.

HYDROLYSIS STEP

The acid mixture was maintained at 30° C. and rapidly stirred (550–600 rpm) while an 18.2% solution of trichlorosilane (430.3 g/3.18 moles) in toluene (1928 g/20.96 moles) was added at a rate of 8.7 mL/min below the liquid surface. The temperature of the medium was maintained at 30° C. during the 4 hour 52 minute addition and for 30 minutes during a post reaction stir. When the agitation was stopped, the mixture separated into 2 phases and 1407.6 grams of the acid phase was removed and analyzed to reveal 77.5 weight percent toluensulfonic acid. The acid number of the organic phase was 60 mg KOH/gram sample. The organic phase was twice washed with 1 liter of 50% sulfuric acid with subsequent separation. The acid number of the organic phase was now 0.76 mg KOH/gram sample. 51.4 grams of calcium carbonate and 3 ml of water was added to neutralize the gently stirred organic phase. The organic phase was dried by adding 145.12 grams of magnesium sulfate and filtering through a 1 inch thick layer of acid washed supercell on a frit glass. The filtrate was placed in a 3 L flask and distilled at 112° C. for 72 minutes. The resulting solution contained 57.7% solids. The solution was split; the first portion to be dried to a powder and the second to be solvent exchanged. The first portion consisted of 136.52 g and it was stripped at 60° C. and 3.6 mm Hg for 1 hour 5 minutes on a rotary evaporator to yield 78.82 grams of a white powder. The second portion consisted of 116.9 grams which was added to 112.8 grams of dodecane (99%). Solvent was removed by distillation under vacuum until 156.2 grams of toluene free resin in dodecane remained.

The total yield of resin in the two portions was 87.3%. (78.82 g in the portion which was stripped). The resin was 100% soluble with a maximum of 56.7% solids in dodecane. The number average molecular weight M(n) was 1464 and 1559 when duplicated. The weight average molecular weight M(w) was 10258 and 11012 when duplicated. The Z-average molecular weight M(z) was 31091 and 34804 when duplicated. The molecular weight dispersity, Mw/Mn, was 7.00 and 7.06 when duplicated. An elemental analysis of the product revealed 34 ppm chloride, 0.016% sulfur, 1.98% carbon, 0.89% hydrogen, 0.9865% Si-H, <5 ppm calcium, <0.5 ppm magnesium and 540 ppm silanol.

EXAMPLE 2

To demonstrate the method of selecting appropriate neutralizing agents, samples of a polymer produced in a manner similar to that of Example 1 were dissolved in toluene and contacted with various mild neutralizing agents. Agents which did not result in gas evolution or gel formation are preferred. Others which only slowly cause gas evolution or gelling may be suitable for use if care is taken to minimize contact time of the neutralizing agent and hydrolyzates during the process of the invention.

TABLE 1

NEUTRALIZATION-PHASE SEPARATION STUDY
Each of the following substances were added to 2.0 grams of a 5.88 (or 7.59 where indicated *) weight percent resin solution in toluene.

| Substance Added | Nature of Phase | | Observations |
|---|---|---|---|
| | Top | Bottom | |
| 2 g water | clear | opaque | Viscous interfacial layer present** |
| 2 g 7% aqueous NaHCO$_3$ | clear | opaque | Viscous interfacial layer present** |
| 2 g 7% aq NaHCO$_3$ + 0.5 gm Heptane | clear | opaque | Viscous interfacial layer present** |
| 2 g water + | clear | opaque | Viscous interfacial |

TABLE 1-continued
NEUTRALIZATION-PHASE SEPARATION STUDY
Each of the following substances were added to 2.0 grams of a 5.88 (or 7.59 where indicated *) weight percent resin solution in toluene.

| Substance Added | Nature of Phase Top | Nature of Phase Bottom | Observations |
|---|---|---|---|
| 0.5 gm heptane | | | layer present** |
| 2 g water + 1 gm IPA | clear | clear | Gels in 2 hr |
| 2 g 7% aq NaHCO₃ + 1 gm IPA | no separation | | Mixture gels with gas evolution |
| 2 g water + 0.5 gm IPA | clear | clear | Gel at interface after 2 hrs |
| 2 g 1% aq NaHCO₃ + 1 gm IPA | no separation | | Mixture gels with gas evolution |
| 2 g 2% aq CaCO₃* | no separation | | Poor separation - solids at interface |
| 2 g 2% aq CaCO₃ + 1 gm IPA | clear | clear | Gels with time |
| 2 g water + 1 drop Et₃N* | no separation | | Instantly gases and gels |
| 0.2 g dry CaCO₃* | clear | clear | Readily separates, stable after 17 days |
| 0.1 g dry NaHCO₃* | clear | clear | Readily separates, stable after 17 days |

**The viscous opaque interfacial layer is thought to be an emulsion resulting from a mixing of the layers due to the surfactant nature of the polymer.

What is claimed is:

1. A method of hydrolyzing a silane of the formula $H_aSiX_{4-a}$ where a is 1 or 2 and X is a hydrolyzable group, to produce polymers containing units of the formula $H_aSiO_{(4-a)/2}$, the method comprising:
   forming a hydrolysis medium containing an arylsulfonic acid hydrate.
   adding a the silane to the agitated hydrolysis medium,
   facilitating hydrolysis of the silane in the hydrolysis medium to form the polymer,
   settling the hydrolysis medium and polymer into immiscible layers comprising an acid layer and an organic layer where the organic layer contains the polymer,
   separating the organic layer from the acid layer,
   contacting the organic layer with a neutralizing agent sufficiently basic to neutralize the remaining acid species but insufficiently basic to catalyze rearrangement of the polymer or solvolysis of silicon hydrides, and
   separating the organic layer from the neutralizing agent.

2. The method of claim 1 wherein the resultant polymer contains 100-2000 ppm hydroxyl groups attached to the silicon atom.

3. The method of claim 1 wherein the liquid containing the silane further comprises one or more organosilanes of the formulas $R_aSiX_{4-a}$ or $R'RSiX_2$ where a is one or two, X is a hydrolyzable group, R is alkyl, aryl, unsaturated hydrocarbon, substituted alkyl or substituted aryl and R' is R or H.

4. The method of claim 3 wherein the liquid containing the silane comprises mixtures of silanes selected from the group consisting of:
   HSiX3 and RSiX3;
   HSiX3 and RR'SiX₂;
   HSiX3, RR'SiX₂ and H₂SiX₂; and
   HSiX3 and H₂SiX₂
wherein R is alkyl, a cycloalkyl, a cycloalkenyl, an aryl, an unsaturated hydrocarbon, or any of the above groups substituted with halogens, alkyls or aryls, R' is R or H and X=a hydrolyzable group.

5. The method of claim 1 wherein the liquid containing the silane consists essentially of the silane and a hydrocarbon solvent.

6. The method of claim 5 wherein the hydrocarbon solvent consists of one or more solvents selected from the group consisting of the aliphatics, aromatics, cycloaliphatics, halogenated aliphatics and halogenated aromatics.

7. The method of claim 6 wherein the hydrocarbon solvent is toluene.

8. The method of claim 1 wherein the hydrolyzable groups are independently selected from the group consisting of (a) organic groups linked to the silicon atom by an oxygen bond and (b) halogens.

9. The method of claim 6 wherein the hydrolyzable groups are independently selected from the group consisting of (a) organic groups linked to the silicon atom by an oxygen bond and (b) halogens.

10. The method of claim 6 wherein the silane is trichlorosilane.

11. The method of claim 7 wherein the silane is trichlorosilane.

12. The method of claim 1 wherein the hydrolysis medium is formed by combining an aromatic hydrocarbon and concentrated sulfuric acid.

13. The method of claim 9 wherein the hydrolysis medium is formed by combining an aromatic hydrocarbon and concentrated sulfuric acid.

14. The method of claim 1 wherein the hydrolysis medium is formed by diluting an arylsulfonic acid hydrate in a solvent.

15. The method of claim 12 wherein the aromatic hydrocarbon is selected from the group consisting of benzene, toluene and xylene.

16. The method of claim 13 wherein the aromatic hydrocarbon is selected from the group consisting of benzene, toluene and xylene.

17. The method of claim 13 wherein the aromatic hydrocarbon is toluene.

18. The method of claim 12 wherein the concentrated sulfuric acid is treated with fuming sulfuric acid to consume the bulk of water present.

19. The method of claim 16 wherein the concentrated sulfuric acid is treated with fuming sulfuric acid to consume the bulk of water present.

20. The method of claim 1 wherein the hydrolysis medium is formed prior to the addition of the silane.

21. The method of claim 19 wherein the hydrolysis medium is formed prior to the addition of silane.

22. The method of claim 1 wherein the separated organic layer is washed with aqueous sulfuric acid prior to neutralization.

23. The method of claim 21 wherein the separated organic layer is washed with aqueous sulfuric acid prior to neutralization.

24. The method of claim 1 wherein the neutralizing agent is selected from the group consisting of calcium carbonate, sodium carbonate, sodium bicarbonate, calcium oxide and calcium hydroxide.

25. The method of claim 9 wherein the neutralizing agent is selected from the group consisting of calcium carbonate, sodium carbonate, sodium bicarbonate, calcium oxide and calcium hydroxide.

26. The method of claim 13 wherein the neutralizing agent is selected from the group consisting of calcium carbonate, sodium carbonate, sodium bicarbonate, calcium oxide and calcium hydroxide.

27. The method of claim 23 wherein the neutralizing agent is selected from the group consisting of calcium carbonate, sodium carbonate, sodium bicarbonate, calcium oxide and calcium hydroxide.

28. The method of claim 23 wherein the neutralizing agent is calcium carbonate.

29. The method of claim 1 further comprising drying or filtering the neutralized organic layer with an agent which insures that any water soluble salts formed during neutralization or any other insolubles are removed.

30. The method of claim 16 further comprising drying or filtering the neutralized organic layer with an agent which insures that any water soluble salts formed during neutralization or any other insolubles are removed.

31. The method of claim 27 further comprising drying or filtering the neutralized organic layer with an agent which insures that any water soluble salts formed during neutralization or any other insolubles are removed.

32. The method of claim 29 further comprising recovering the polymer by evaporating the solvents.

33. The method of claim 30 further comprising recovering the polymer by evaporating the solvents.

34. The method of claim 31 further comprising recovering the polymer by evaporating the solvents.

35. The method of claim 29 further comprising performing a solvent exchange in the organic layer.

36. The method of claim 30 further comprising performing a solvent exchange in the organic layer.

37. The method of claim 31 further comprising performing a solvent exchange in the organic layer.

38. A method of hydrolyzing a silane of the formula $HSiCl_3$ to produce a polymer containing units of the formula $HSiO_{3/2}$, the method comprising:

forming a toluenesulfonic acid hydrate hydrolysis medium by combining toluene and concentrated sulfuric acid, adding trichlorosilane dissolved in toluene to the agitated hydrolysis medium, facilitating hydrolysis of the silane in the hydrolysis medium to form the polymer, settling the hydrolysis medium and polymer into immiscible layers comprising an acid layer and an organic layer where the organic layer contains the polymer and toluene, separating the organic layer from the acid layer and washing the organic layer with aqueous sulfuric acid, contacting the organic layer with calcium carbonate to neutralize the remaining acid species, separating the organic layer from the calcium carbonate, contacting the neutralized organic layer with a drying agent, separating the organic layer from the drying agent, and evaporating the solvent.

* * * * *